United States Patent [19]

Genuit et al.

[11] 3,728,558

[45] Apr. 17, 1973

[54] SYNCHRONIZED TRIGGER GENERATORS FOR USE WITH A SWITCHING REGULATOR

[75] Inventors: Luther L. Genuit, Scottsdale; John R. Nowell, Phoenix, both of Ariz.

[73] Assignee: Honeywell Information Systems Inc., Waltham, Mass.

[22] Filed: Oct. 20, 1971

[21] Appl. No.: 190,860

[52] U.S. Cl. ..................307/262, 307/247, 307/260, 307/275, 321/2, 331/112

[51] Int. Cl. ..............................................H03k 3/30

[58] Field of Search......................307/247, 260, 262, 307/275; 331/112

[56] References Cited

UNITED STATES PATENTS

| | | | |
|---|---|---|---|
| 3,219,906 | 11/1965 | Keller et al. | 321/16 |
| 3,213,378 | 10/1965 | Neeteson | 307/260 X |
| 3,381,088 | 4/1968 | Lentz et al. | 307/262 X |
| 3,059,128 | 10/1962 | Cramer | 307/247 R |
| 3,648,181 | 3/1972 | Fiore et al. | 307/262 X |

*Primary Examiner*—Stanley D. Miller, Jr.
*Attorney*—Lloyd B. Guernsey et al.

[57] ABSTRACT

A JK flip-flop provides signals to alternately trigger first and second transistor blocking oscillators which supply trigger signals for a switching regulator. Each of the blocking oscillators uses a capacitor between the transistor base and ground to reduce the effects of noise signals and uses an inductor in the transistor emitter circuit to prevent high frequency oscillations.

7 Claims, 6 Drawing Figures

INVENTORS
JOHN R. NOWELL
LUTHER L. GENUIT
By Lloyd B. Guernsey
AGENT

SYNCHRONIZED TRIGGER GENERATORS FOR USE WITH A SWITCHING REGULATOR

BACKGROUND OF THE INVENTION

This invention relates to a trigger generator for use with a switching regulator and more particularly to a generator which uses a transistor blocking oscillator to provide trigger signals for a switching regulator. The blocking oscillator disclosed eliminates a need for a bias voltage at the base of the transistor by employing a capacitor between the transistor base and ground to reduce the effects of noise signals. This blocking oscillator uses an inductor in the transistor emitter circuit to prevent the capacitor from causing high frequency oscillations.

In high speed data processing systems switching regulators may be used to provide D.C. power to electronic circuits in the system. These regulators are smaller and more efficient than prior art power supplies so that the regulators may be located in the cabinets which contain the circuits rather than in a separate cabinet as required when prior art power supplies are used. Location of regulators near the circuits greatly reduces the length of cables which distribute the current to the circuits and reduces the amount of error signals which may be caused by variation in voltage in long cables.

The switching regulator may employ a transformer, a pair of silicon controlled rectifiers and a source of signals to convert an unregulated D.C. voltage, such as 150 volts, to an accurately regulated voltage, such as one volt. The silicon controlled rectifiers are employed as switches between the sources of unregulated D.C. voltage and the transformer. The silicon controlled rectifiers are located on the "high" voltage side of the transformer where the current and power losses in these rectifiers are low, thereby causing the switching regulator to have a high degree of efficiency. The regulated D.C. voltage obtained from a secondary winding on a transformer is supplied to a pair of voltage output terminals. The transformer provides isolation between the regulated D.C. voltage and the source of unregulated D.C. voltage so that a short circuit in a silicon controlled rectifier will not cause damage to the microcircuit modules which provide the load on the switching regulator.

The silicon controlled rectifier is a semi-conductor device having an anode, a cathode and a gate. The silicon controlled rectifier can be used as an ON-OFF switch which can be turned on in a very few microseconds. Normally, the silicon controlled rectifier cannot conduct current between anode and cathode thereof until a pulse of current larger than a threshold value flows from gate to cathode. If a positive voltage difference exists between the anode and the cathode when a pulse of current flows into the gate, the silicon controlled rectifier "fires"; i.e., is rendered conductive and a current will flow from the anode to the cathode. The rate at which the current flow from anode to cathode increases when the silicon controlled rectifier fires must be limited to prevent damage to the rectifier. Once anode-cathode flow commences, the gate has no further control over such current flow. Current flow from anode to cathode in a rectifier can be terminated only by reducing the anode to cathode current below a "holding" or minimum current value. A more detailed description of the operation of a silicon controlled rectifier can be found in the "Silicon Controlled Rectifier Manual", 4th edition, 1967, published by the General Electric Company, Syracuse, N.Y.

A signal source is coupled to the voltage output terminals and develops trigger signals whose frequency is determined by the value of voltage at the voltage output terminal. The trigger signals are coupled to the silicon controlled rectifiers in the switching regulator and cause these rectifiers to deliver energy through the transformer to output filter capacitors which are connected to the voltage output terminal. The signal source senses any change in the value of regulated output voltage and causes a change in the frequency of the trigger signals delivered to the switching regulator.

Prior art signal sources include a rate generator and a bistable multivibrator. The rate generator develops trigger pulses having a frequency which is determined by the voltage at the output terminals of the switching regulator. These trigger pulses are applied to the multivibrator which develops trigger signals which are applied to the gates of the silicon controlled rectifiers. The multivibrator uses resistors as the load impedances in the collector circuits. These resistors dissipate relatively large amounts of power so that the efficiency of the prior art signal source is low. What is needed is a more efficient circuit for developing trigger signals.

Blocking oscillators employ a primary winding of the transformer as an impedance in the collector circuit so that relatively small amounts of power are dissipated in this impedance. The blocking oscillators also provide a relatively large amount of output signal current which could be used to fire the silicon controlled rectifiers. The blocking oscillator has an additional advantage in that it delivers a square wave of output current which can be readily analyzed to determine whether or not adequate drive is being applied to the gates of the silicon controlled rectifiers. However, prior art blocking oscillators have the disadvantage of requiring a bias voltage supply for the base of the transistor in order to prevent noise voltage from triggering the blocking oscillator. The present invention includes a capacitor between the base of the transistor and ground to prevent noise signals from triggering the blocking oscillator. This capacitor may cause the blocking oscillator to operate as a free running oscillator at a frequency much higher than the blocking oscillator frequency. The present invention alleviates this tendency of the blocking oscillator to operate as a free running oscillator by using an inductor between the emitter of the transistor and ground.

It is, therefore, an object of this invention to provide a new and improve generator for triggering silicon controlled rectifiers in a switching regulator.

Another object of this invention is to provide an improved blocking oscillator for triggering silicon controlled rectifiers in a switching regulator.

A further object of this invention is to provide a blocking oscillator circuit having improved noise rejection.

Still another object of this invention is to provide a blocking oscillator having improved noise rejection and means for preventing spurious oscillations.

SUMMARY OF THE INVENTION

The foregoing objects are achieved in the present invention by providing a new and improved transistor blocking oscillator having means for improving the noise rejection and for preventing spurious oscillations. A capacitor connected between the base of the transistor and ground prevents noise pulses from triggering the blocking oscillator. An inductor connected between the emitter of the transistor and ground prevents the blocking oscillator from operating as a free running oscillator.

Other objects and advantages of this invention will become apparent from the following description when taken in connection with the accompanying drawings.

DESCRIPTION OF THE PREFERRED EMBODIMENT

Figure 1:
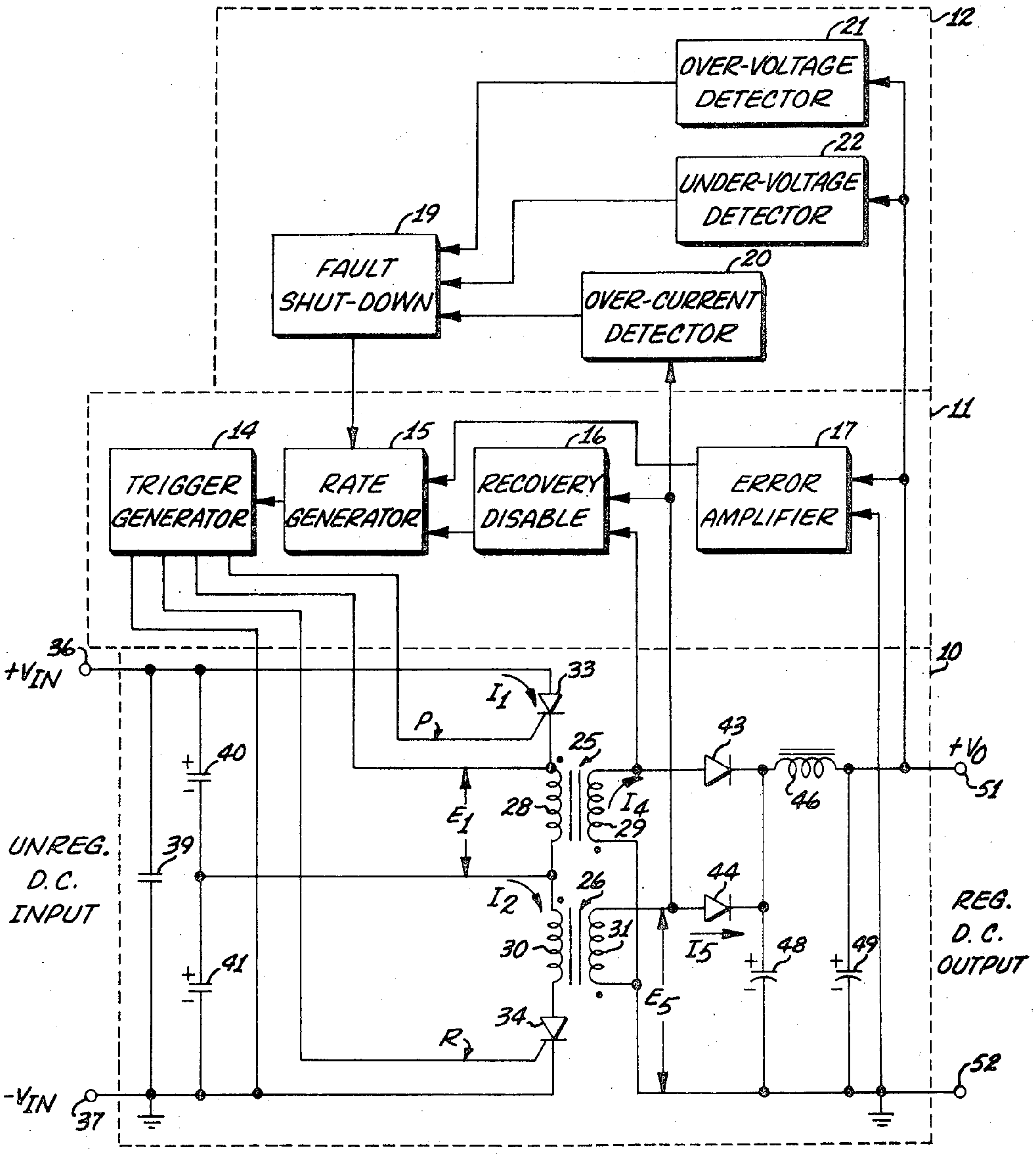
FIG. 1 is a schematic drawing of a switching regulator and its associated control circuits including the present invention.

Referring more particularly to the drawings by the characters of reference, FIG. 1 discloses a power supply system which is designed to provide a constant supply of D.C. output voltage for a wide range of values of output current and for monitoring the current delivered to a load which may be connected to the system. As indicated in FIG. 1, the system comprises a switching regulator 10, a switching regulator control circuit 11 for providing trigger signals to switching regulator 10, and a circuit 12 for monitoring the current and the voltage delivered by the power supply. The switching regulator control circuit 11 comprises a trigger generator 14, a rate generator 15, a recovery disable circuit 16 and an error amplifier 17. The error amplifier 17 detects any change in voltage at the output terminals of the switching regulator and provides a signal whose value is determined by the change in the output voltage. The signal from the error amplifier 17 causes the rate generator 15 to develop pulses having a frequency which is determined by the value of the signal from the amplifier 17. Pulses from the rate generator cause the trigger generator 14 to develop trigger pulses for the switching regulator. The recovery disable circuit 15 senses the time that output current is being delivered by the switching regulator to the output filter capacitors and prevents the rate generator from delivering pulses during the time that the current is being delivered.

The cover-current detector 20, the over-voltage detector 21 and the under-voltage detector 22 sense any abnormal values of current or voltage at the output of the switching regulator and provide signals to the fault shutdown circuit 19. When the fault shutdown circuit 19 receives a signal from any of the detectors 20, 21 and 22 it provides a signal to the rate generator which disables the rate generator and prevents any pulses from being supplied to trigger the switching regulator.

SWITCHING REGULATOR

As indicated in FIG. 1, switching regulator 11 includes a pair of transformers 25 and 26, each having a primary winding and a secondary winding. The primary windings 28 and 30 are connected in series and are coupled to the high voltage unregulated D.C. power supply having a positive output terminal 36 and a negative output terminal 37. A pair of silicon controlled rectifiers 33 and 34 control the current supplied by the power supply to the primary windings of transformers 25 and 26. The anode of silicon controlled rectifier 33 is connected to the positive terminal 36 of the unregulated D.C. power supply and the cathode of silicon controlled rectifier 33 is connected to the upper end of primary winding 28. The gate of silicon controlled rectifier 33 is connected to one lead of the trigger generator 14 which provides trigger signals to render rectifier 33 conductive. The anode of silicon controlled rectifier 34 is connected to the lower end of primary winding 30 and the cathode of silicon controlled rectifier 34 is connected to the negative terminal of the unregulated D.C. power supply. A second lead from the trigger generator 14 is connected to the gate of silicon controlled rectifier 34 to provide trigger signals to render rectifier 34 conductive.

Figures 2, 3:
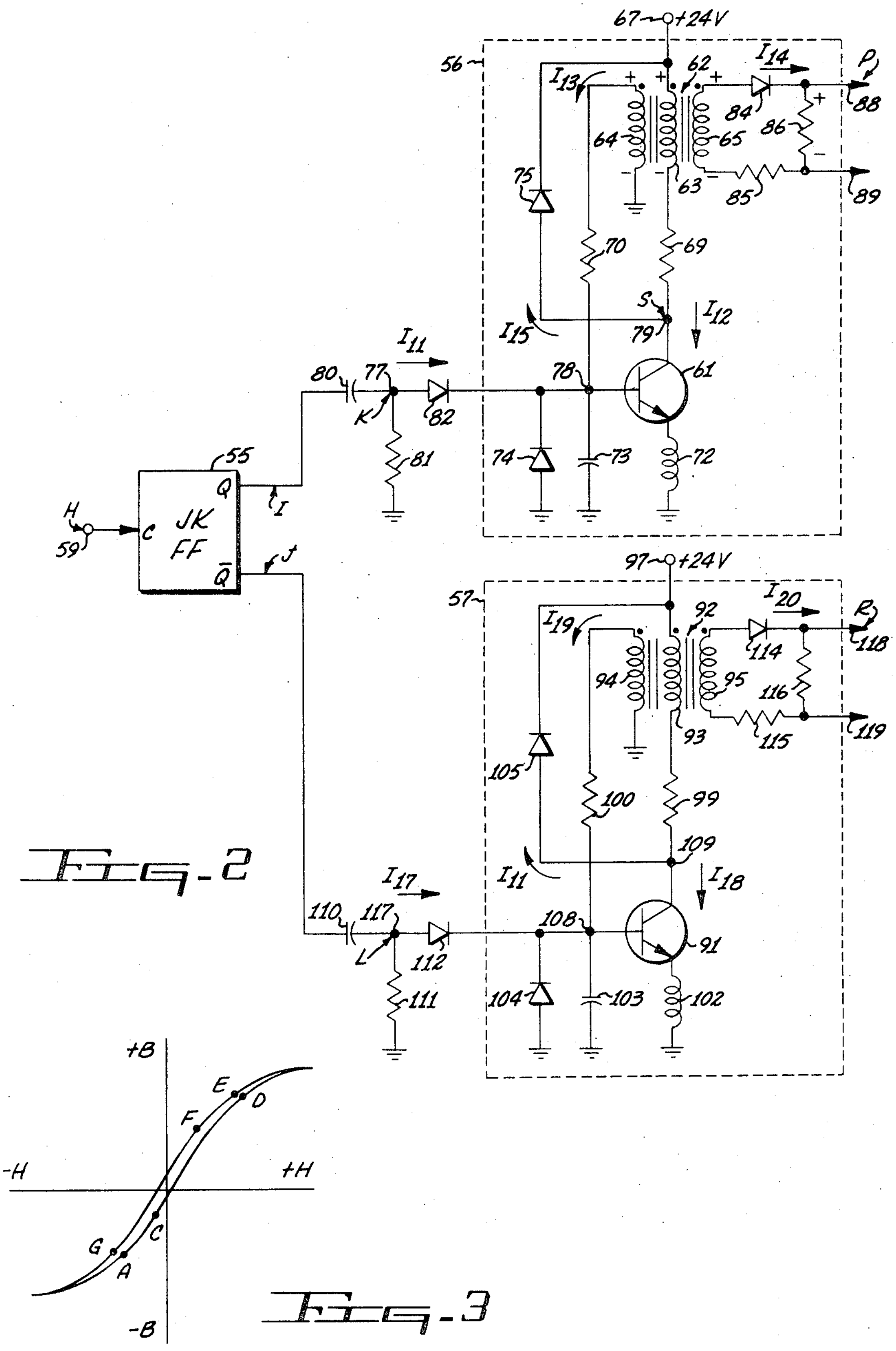
FIG. 2 is a schematic drawing of an embodiment of the present invention.
FIG. 3 illustrates a magnetization curve which is useful in explaining the operation of the circuit shown in FIG. 1.

The magnetic core employed in transformers 25 and 26 produces the magnetization characteristics illustrated in the magnetization curve of FIG. 3. The magnetizing force H is equal to the product of the number of turns in a winding on the transformer core and the number of amperes of current for each turn of wire divided by length of the core. Since the physical length of the particular transformer core is constant the magnetizing force of the transformer is often expressed as the number of amperes times the number of turns, or "ampere - turns". The flux density B is the number of lines of flux per square centimeter of the transformer core and is determined by the value of the magnetizing force and the type of material used in the core. A discussion of the magnetization curves can be found in the text book "Magnetic Circuits and Transformers" by E.E. Staff, M.I.T., 1943, published by John Wiley & Sons, New York, N.Y.

Figure 4:
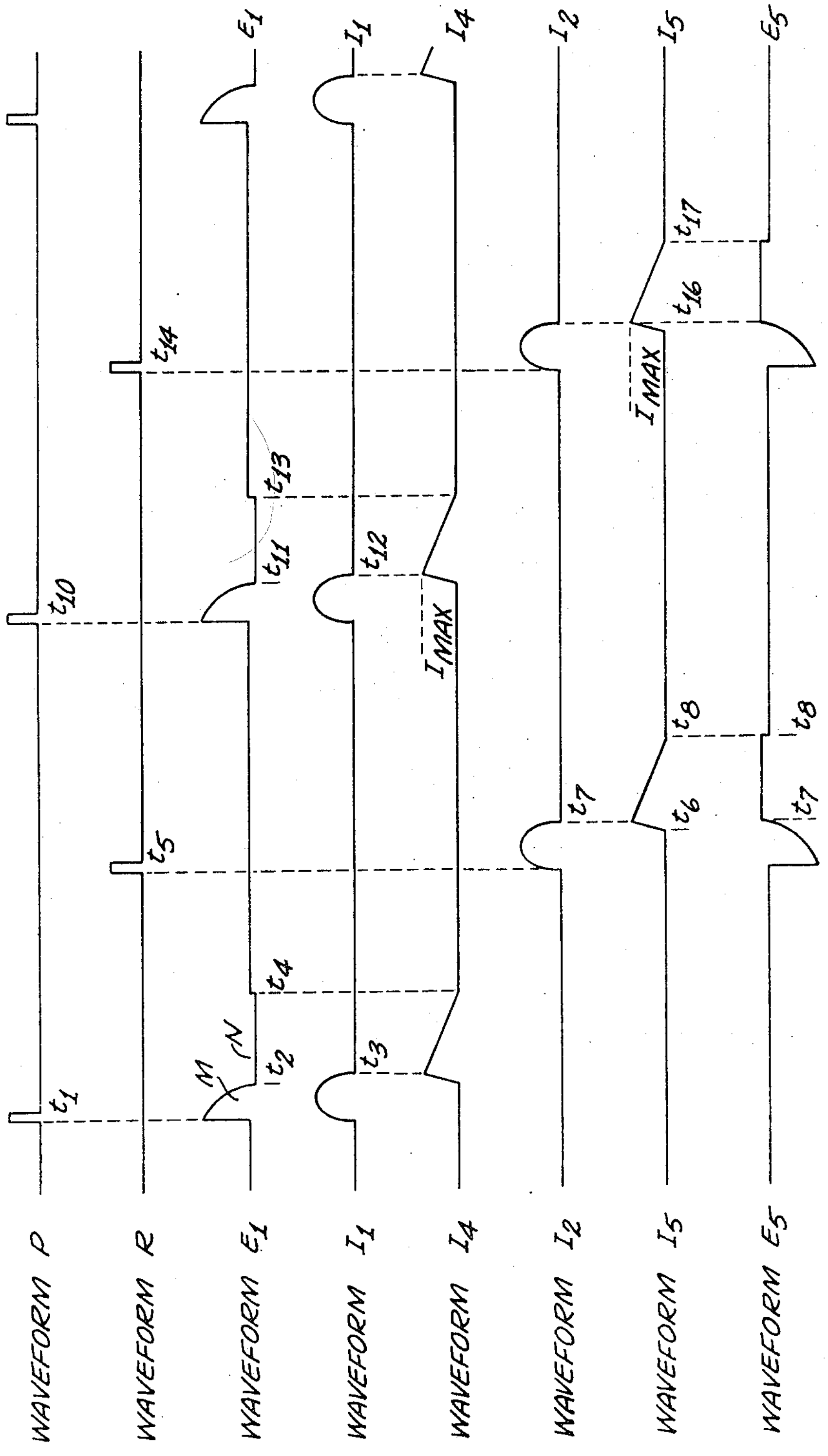
FIGS. 4, 5 and 6 illustrate waveforms which are useful in explaining the present invention.

The operation of the circuit of FIG. 1 will now be discussed in connection with the magnetization curve shown in FIG. 3 and the waveforms shown in FIG. 4.

A pair of capacitors 40 and 41 provide predetermined quantities of electrical energy to the transformers 25 and 26 each time one of the silicon controlled rectifiers 33 and 34 is rendered conductive. Each time one of the silicon controlled rectifiers 33 and 34 is rendered non-conductive the same predetermined quantity of energy is delivered by one of the transformers 25 and 26 through diodes 43 and 44 to a filter capacitor 48. Prior to the time $tt_1$ shown in FIG. 4, capacitor 40 of FIG. 1 is charged to the polarity shown in FIG. 1. At time $t_1$ a pulse from trigger generator 14 renders silicon controlled rectifier 33 conductive so that the voltage across the capacitor 40 is supplied to the primary winding 28 of transformer 25 causing a current $I_1$ to flow from the upper plate of capacitor 40 through to anode to cathode of rectifier 33, through the primary winding 28 to the lower plate of capacitor 40. The current $I_1$ through primary winding 28 causes a change of flux in the transformer core and causes the operating point to move from point A toward point C of the magnetization curve in FIG. 3. This change in flux produces a voltage across primary winding 28, which limits the rate of increase in current through silicon controlled rectifier 33, thus preventing possible damage to rectifier 33. A positive voltage applied to the upper end of primary winding 28 causes the operating point to move upward from point C toward point D. The distance between point C and D is proportional to the product of the voltage applied to primary winding 28 and the duration of time this voltage is applied.

The voltage applied to the primary winding 28 is magnetically coupled through the transformer core to the secondary winding 29. Between time $t_1$ and time $t_2$ secondary winding 29 has a positive polarity of voltage at the lower end of the winding and a negative polarity of voltage at the upper end of the winding. At this time, the voltage across the secondary winding 29 causes diode 43 to be back biased so that no current flows through the diode or through the secondary winding 28. Capacitor 40 provides current $I_1$ until this capacitor has discharged at time $t_2$ as shown in waveform $I_1$ of FIG. 4. The area M under the curve of waveform E1 (FIG. 4) between time $t_1$ and $t_2$ is the sum of the products of the voltage applied to primary winding 28 and the duration of the time the voltage is applied and this area M represents the total energy stored in the core of transformer 25. When the voltage applied to primary winding 28 has a zero value at time $t_2$, the operating point reaches point D.

At time $t_2$, the energy stored in the core of transformer 25 reverses the polarity of voltage across each of the transformer windings so that negative polarity of voltage is developed at the upper end of primary winding 28. This negative polarity of voltage at the upper end of primary winding 28 causes the operating point in FIG. 3 to move from point D toward point E and to begin moving toward point A. Again the distance between point E and point A is proportional to the product of the voltage across primary winding 28 and the duration of time this voltage is applied. The area N under the curve of waveform $E_1$ between times $t_2$ and $t_4$ is the sum of the products of voltage across primary winding 28 and the time this voltage is applied. The area N under the curve of waveform $E_1$ between times $t_2$ and $t_4$ is the sum of the products of voltage across primary winding 28 and the time this voltage is applied. In this area N represents a total energy which the core of transformer 28 returns through the transformer. The voltage across primary winding 28 causes current $I_1$ to charge capacitor 40 to a polarity opposite to the polarity shown in FIG. 1.

The energy in the core of transformer 25 causes the voltage across secondary winding 29 to increase to a value larger than the voltage across filter capacitor 48 so that a current $I_4$ flows through diode 43 to charge capacitor 48. The energy which is stored in the core of the transformer 25 when silicon controlled rectifier 33 conducts is proportional to the difference between the between the flux at point A and point D on the magnetization curve of FIG. 3; and the energy which is transferred to the secondary winding 29 when silicon controlled rectifier 33 is rendered nonconductive, is proportional to the difference between the flux at point E and point A.

Since the distance between point A through point C to point D shown in FIG. 3 is substantially the same as the distance between points E through point F to point A, substantially all of the energy which was stored in the core of the transformer between times $t_1$ and $t_2$ is returned and is stored in capacitors 48 and 49. Capacitor 40 delivers substantially the same amount of energy to the transformer each time the silicon controlled rectifier 33 is rendered conductive so that the amount of energy delivered to filter capacitors 48 and 49 and the voltage across these capacitors is determined by the frequency of the signals applied to the gate of rectifier 33.

Capacitor 41 also provides a predetermined quantity of energy to the transformer 26 each time silicon controlled rectifier 34 is rendered conductive. A more detailed description of the operation of the switching regulator can be found in the U.S. Pat. No. 3,518,526 by Luther L. Genuit, issued June 30, 1970, entitled "-Switching Regulator".

Prior to time $t_5$, capacitor 41 is charged to the polarity shown in FIG. 1. At time $t_5$ a pulse from the trigger generator 14 renders silicon controlled rectifier 34 conductive so that current $I_2$ flows from the upper plate of capacitor 41 through the primary winding 30, from anode to cathode of rectifier 34 to the lower plate of capacitor 41. Current $I_2$ through the primary winding and the voltages impressed across this winding cause the operating point of the characteristic curve in FIG. 3 to move from point A through point C to point D and causing a predetermined quantity of energy to be stored in the core of transformer 26. When silicon controlled rectifier 34 is rendered nonconductive, this energy is transferred through the secondary winding 31 causing a current $I_5$ to charge capacitor 48 as described above.

The amount of voltage across the capacitors 48 and 49 can be controlled by controlling the frequency of the trigger signals which trigger generator 14 applies to the gates of silicon controlled rectifiers 33 and 34. The frequency of the trigger signals is determined by the value of the current applied to the rate generator 15. When an increase in the amount of current drawn by a load (not shown) connected across the output terminals 51 and 52 in FIG. 1 causes the value of the output voltage to fall below a predetermined reference level, the frequency of the signals from trigger generator 14 increases. This increase in the frequency of the output signals causes an increase in the rate of energy delivered to filter capacitors 48 and 49 and increases the voltage at the output terminals 51 and 52 to the predetermined reference level. The voltage at the output terminal 51 of the power supply controls the frequency of the signal from the trigger generator 14 so that the voltage at the output terminals 51 and 52 is substantially constant even when the current drawn from this power supply varies over a wide range of values.

TRIGGER GENERATOR

As indicated in FIG. 2, the trigger generator comprises a JK flip-flop 55 and first and second blocking oscillators 56 and 57. The JK flip-flop or bistable multivibrator is a circuit designed to operate in either one of two stable states and to transfer from the state in which it is operating to the other stable state on the application of a trigger signal thereto. In one state of operation the JK flip-flop represents the binary one (1-state) and in the other state the binary zero (0-state). Each time a positive signal pulse is applied to the C input lead the flip-flop changes states. When the JK flip-flop is in the 1-state the upper lead, the Q lead delivers a positive output voltage. When the JK flip-flop is in the 0-state the lower lead, the $\overline{Q}$ output lead, delivers a positive output voltage.

The structure and the operation of blocking oscillators 56 and 57 are identical so that only the operation of blocking oscillator 56 will be discussed. Blocking oscillator 56 includes a transistor 61 having a base, a collector and an emitter. A transformer 62 having a primary winding 63 and first and second secondary windings 64 and 65 is used to provide feedback from the collector to the base of transistor 61 and to couple the output current to the silicon controlled rectifier. The primary winding 63 and a resistor 69 are connected in series between the collector of transistor 61 and a terminal 67 which is connected to a positive potential such as +24 volts. Resistor 69 limits the maximum value of current flow from collector to emitter of transistor 61 when the transistor is rendered conductive. Secondary winding 64 and resistor 70 are connected in series between the base of transistor 61 and a second reference potential such as ground. Resistor 70 limits the value of current flow from base to emitter of transistor 61 when current in the transistor is increasing.

The operation of the blocking oscillator 56 of FIG. 2 will now be discussed in connection with the waveforms shown in FIGS. 5 and 6B.

When the voltage at the Q output lead of flip-flop 55 increases to a positive value as shown at time $t_1$ in waveform I (FIG. 5) this voltage is differentiated by capacitor 80 and resistor 81 to provide the waveform K at junction point 77 of FIG. 2. The positive voltage at junction point 77 causes a current $I_{11}$ to flow from point 77 through diode 82, from base to the emitter of transistor 61, through inductor 72 to ground. Current $I_{11}$ renders transistor 61 conductive so that a current $I_{12}$ flows from terminal 67 through primary winding 63, through resistor 69, from collector to emitter of transistor 61 through inductor 72 to ground. Current $I_{12}$ through primary winding 63 provides a voltage of the potential shown across primary winding 63 and across secondary windings 64 and 65. The voltage across secondary winding 64 causes a current $I_{13}$ to flow from ground through winding 64, through resistor 70, from base to emitter of transistor 61 through inductor 72 to ground. Current $I_{13}$ from base to emitter of transistor 61 increases the conductivity of transistor 61 so that current $I_{12}$ from collector to emitter of transistor 61 increases. The increase in current $I_{12}$ provides an increase in the voltage across secondary winding 64 which in turn increases the current $I_{13}$, thereby causing transistor 61 to saturate. During the time that current $I_{12}$ is increasing energy is stored in the core of transformer 62. When current $I_{12}$ is increasing the voltage across the secondary winding 65 causes a current $I_{14}$ to flow from the top of winding 65 through diode 84 to output lead 88. Leads 88 and 89 are connected to the gate and cathode respectively of the silicon controlled rectifier 33 (FIG. 1) so that current $I_{14}$ causes the silicon controlled rectifier 33 to be rendered conductive.

When current $I_{12}$ increases the magnetic flux density in the core of transformer 62 increases until the core starts to saturate. When the core starts to saturate the voltage across the windings 63, 64 and 65 decreases. When the voltage across winding 64 decreases current $I_{13}$ through the base to emitter of transistor 61 decreases which causes current $I_{12}$ to decrease. A decrease in current $I_{12}$ causes a reversal in the polarity of voltage across windings 63, 64 and 65. The reversal in polarity of voltage across winding 64 causes transistor 61 to "turn off" or be rendered nonconductive very rapidly. The reversal in polarity of voltage across winding 65 reverse biases diode 84 so that it is nonconductive and the voltage at the gate of the silicon controlled rectifier 33 (FIG. 1) has a value of zero. At this same time a positive polarity at the lower end of primary winding 63 causes a current $I_{15}$ to flow from the lower end of winding 63 through resistor 69 and diode 75 to the upper end of primary winding 63. This current $I_{15}$ prevents ringing or oscillations in the transformer when energy is returned from the transformer core to the windings. Current $I_{15}$ also prevents the voltage across the transformer windings from increasing and causing possible damage to transistor 61.

Blocking oscillator 56 includes a capacitor 73 which prevents noise signals from triggering the oscillator. In blocking oscillator circuits which do not include capacitor 73 positive noise pulses on the input lead may cause the transistor to be rendered conductive so that the blocking oscillator provides the positive signals on the output leads. Capacitor 73 provides a low impedance between base and ground to high frequency noise pulses which may be present on the input leads of the blocking oscillator. This low impedance prevents the noise pulses from rendering transistor 61 conductive. However, capacitor 73 provides a phase shift which may cause the blocking oscillator to function as a free running oscillator.

Figure 5:
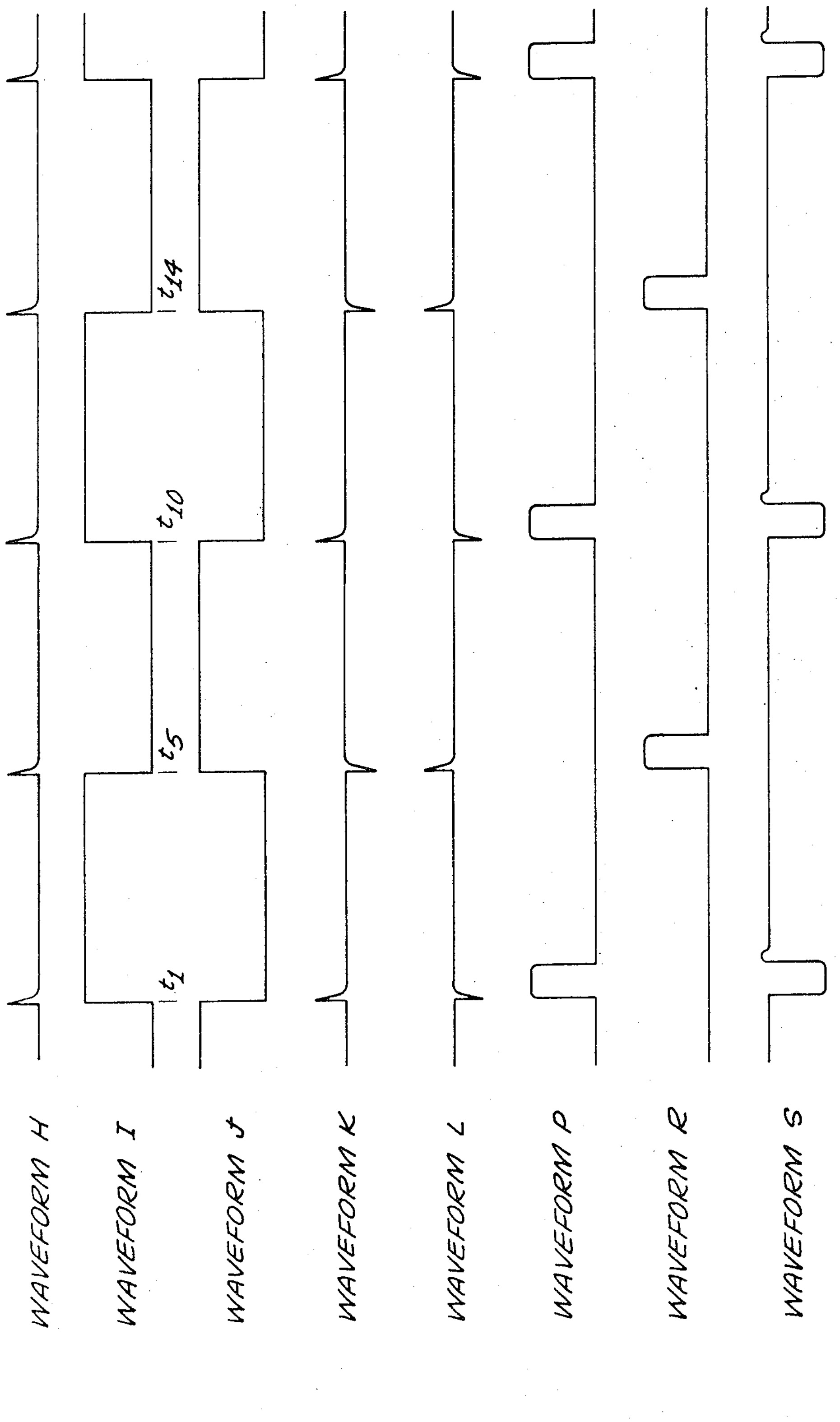
Figure 6A:
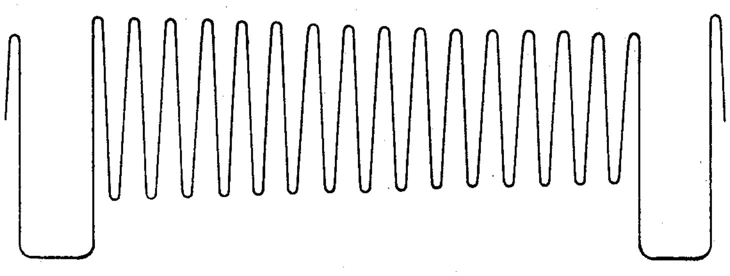
Figure 6B:
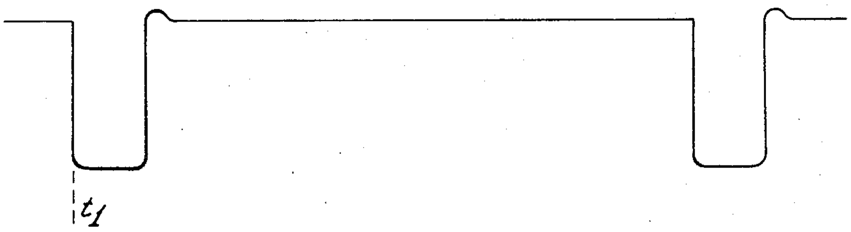

The phase shift can be seen in connection with the input waveform K of FIG. 5 which is applied to the base of transistor 61 and the resulting waveform S at the collector of transistor 61. The positive pulse at the base of transistor 61 causes a negative going pulse at the collector of transistor 61 so that 180° phase shift is present between the base and the collector of the transistor. Transformer 62 provides an additional 180° phase shift so that the voltage at the upper end of secondary winding 64 is positive when the collector of transistor 61 is going negative. The 180° phase shift in the transistor plug the 180° phase shift in the transformer provide the total of 360° so that the voltage fed back to the base of the transistor is the phase desired to cause the oscillator to oscillate. The closing coupling between the primary winding and the secondary winding 64 of transformer 62 causes the transistor 61 to saturate so that the circuit does not operate as a free running oscillator but rather operates as a blocking oscillator. However, high-frequency signals which develop in the transformer 62 may have several additional degrees of phase shift caused by the capacitor 73. The additional phase shift provided by capacitor 73 provides a voltage at junction point 78 which would cause the circuit to oscillate if the inductor 72 were not included between the emitter of transistor 61 and ground. Thus, without inductor 72 circuit 56 would produce the oscillations as shown in waveform 6A.

When an inductor is connected between junction point 78 and the base of the transistor 61 or when an inductor is connected between the emitter and ground this inductor produces an additional phase shift so that the circuit does not operate as a free running oscillator. Any value of inductance which is connected between the emitter of transistor 61 and ground is reflected as a much higher inductance between the base of the transistor and junction point 78. As is well known in the transistor art an impedance between the emitter of a transistor and ground is reflected as beta times the same impedance in the base circuit, where beta is a gain of the transistor. Thus, the value of inductor 72 in the emitter circuit is reflected as beta times this amount of inductance in the base circuit of transistor 61. This relatively large value of inductance in the base-emitter circuit of transistor 61 prevents high-frequency oscillations.

Flip-flop 55 provides signals to alternately trigger blocking oscillators 56 and 57. Each time one of the positive pulses shown in waveform H (FIG. 5) is received at the signal-input terminal 59 the JK flip-flop 55 changes states thereby providing a positive pulse at one of the junction points 77 and 117. For example, at time $t_1$ the positive pulse on the input lead of flip-flop 55 causes the flip-flop to change states so that a positive voltage is developed at the Q output lead as shown in waveform I. This signal at the Q output lead is differentiated by capacitor 80 and resistor 81 to provide the pulse shown in waveform K. This pulse is coupled through diode 82 to the base of transistor 61. The pulse at the base of transistor 61 triggers oscillator 56 so that the square pulse shown in waveform P is coupled through diode 84 to output lead 88. When the next positive pulse is received at input terminal 59 the flip-flop 55 again changes states and develops a positive voltage on the $\overline{Q}$ output lead. This signal at the $\overline{Q}$ output lead is differentiated and triggers blocking oscillator 56, thereby causing blocking oscillator 57 to provide a positive output pulse shown in waveform R of FIG. 5. These positive pulses from oscillators 56 and 57 are applied to the gates of silicon controlled rectifiers 33 and 34 respectively of the switching regulator shown in FIG. 1.

Diodes 82 and 112 reduce the effects of noise voltages in the flip-flop circuit and prevent possible damage to the switching regulator of FIG. 1. If diodes 82 and 112 were not used noise voltages could cause both of the silicon controlled rectifiers to fire at the same time and produce a low impedance between input terminals 36 and 37 (FIG. 1). This low impedance could produce a high current which may damage the rectifiers 33 and 34. For example, if diode 82 were removed from the circuit capacitor 80 would quickly charge through diode 74 when the voltage at the left hand plate of capacitor 80 decreases, such as at time $t_5$, (FIG. 5). Capacitor 80 would charge to a positive polarity on the right hand plate and a negative polarity on the left hand plate. If a positive noise pulse is coupled to the Q output lead of flip-flop 55 following time $t_5$ capacitor 80 would discharge through the base to emitter of transistor 61 causing a pulse to fire silicon controlled rectifier 33 as described above. Since rectifier 34 (FIG. 1) is also conducting at this time, damage to the switching regulator could result. Diode 82 of the circuit of FIG. 2 prevents this rapid charging of capacitor 80 and prevents the firing of transistor 61 and rectifier 33.

Diodes 84 and 114 prevent negative voltages from being coupled to the gates of silicon controlled rectifiers 33 and 34 respectively. Resistors 85 and 115 limit the amount of current which is delivered to the gates of the silicon controlled rectifiers. Diodes 74 and 104 prevent relatively large negative voltages from being coupled to the bases of transistors 61 and 91. Such negative voltages at the base of transistor 61 or transistor 91 could cause damage to the transistor.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

We claim:

1. A blocking oscillator comprising:

a transistor having a base, a collector and an emitter;

a transformer having a primary winding and first and second secondary winding;

first and second reference potentials, a first end of said primary winding being connected to said first potential, a second end of said primary winding being coupled to said collector of said transistor, a first end of said first secondary winding being connected to said second potential, a second end of said first secondary winding being coupled to said base of said transistor;

a capacitor, said capacitor being connected between said second potential and said base of said transistor;

an inductor, said inductor being connected between said second potential and said emitter of said transistor;

an input lead, said input lead being connected to said base of said transistor; and first and second output leads, said first output lead being coupled to a first end of said second secondary winding, said second output lead being coupled to a second end of said second secondary winding.

2. A blocking oscillator as defined in claim 1 including:

first and second diodes, said first diode being connected between said first potential and said collector of said transistor, said second diode being connected between said second potential and said base of said transistor.

3. A blocking oscillator as defined in claim 1 including:

first and second resistors, said first resistor being connected between said collector of said transistor and said second end of said primary winding, said second resistor being connected between said base of said transistor and said second end of said first secondary winding.

4. A blocking oscillator as defined in claim 1 including:

first, second and third diodes, said first diode being connected between said first potential and said collector of said transistor, said second diode being connected between said second potential and said base of said transistor, said third diode being connected between said first output lead and a first end of said second secondary winding; and first, second and third resistors, said first resistor being connected between said collector of said transistor and said second end of said primary winding, said second resistor being connected between said base of said transistor and said second end of said first secondary winding, said third resistor being connected between said second output lead and a second end of said second secondary winding.

5. A trigger generator for use with a switching regulator comprising, in combination:

a flip-flop having an input lead and first and second output leads;

first and second differentiators each having an input lead and an output lead, said input lead of each of said differentiators being connected to a corresponding one of said output leads of said flip-flop;

first and second blocking oscillators each having an input lead and first and second output leads, each of said oscillators including:

a transistor having a base, a collector and an emitter, said input lead of said oscillator being connected to said base of said transistor;

a transformer having a primary winding and first and second secondary windings;

first and second reference potentials, a first end of said primary winding being connected to said first potential, a second end of said primary winding being coupled to said collector of said transistor, a first end of said first secondary winding being connected to said second potential, a second end of said first secondary winding being coupled to said base of said transistor;

a capacitor, said capacitor being connected between said second potential and said base of said transistor; and an inductor, said inductor being connected between said second potential and said emitter of said transistor, said first output lead of said oscillator being coupled to a first end of said secondary winding, said second output lead of said oscillator being coupled to a said second end of said secondary winding, said input lead of each of said oscillators being coupled to a corresponding one of said output leads of said first and said second differentiators.

6. A trigger generator as defined in claim 5 wherein each of said blocking oscillators includes:

first, second and third diodes, said first diode being connected between said first potential and said collector of said transistor, said second diode being connected between said second potential and said base of said transistor, said third diode being connected between said first output lead of said oscillator and a first end of said secondary winding; and first, second and third resistors, said first resister being connected between said collector of said transistor and said second end of said primary winding, said second resistor being connected between said base of said transistor and said second end of said first secondary winding, said third resistor being connected between said second output lead of said oscillator and a second end of said second secondary winding.

7. A trigger generator as defined in claim 5 including:

fourth and fifth diodes each having a cathode and an anode, said fourth diode being connected between said output lead of said first differentiator and said input lead of said first blocking oscillator, said fifth diode being connected between said output lead of said second differentiator and said input lead of said second blocking oscillator.

* * * * *